United States Patent [19]

Kanatsugu et al.

[11] Patent Number: 5,151,779
[45] Date of Patent: Sep. 29, 1992

[54] SIGNAL TRANSMISSION SYSTEM FOR HIGH DEFINITION TELEVISION

[75] Inventors: Yasuaki Kanatsugu; Taiichiro Kurita; Taiji Nishizawa; Yutaka Tanaka; Ryoichi Yajima; Shoichi Suzuki; Hisakazu Kato; Kazumasa Enami; Haruo Okuda; Satoru Koizumi; Hideki Suganami; Toshiyuki Takegahara; Kaoru Watanabe, all of Tokyo, Japan

[73] Assignee: Nippon Hoso Kyokai, Tokyo, Japan

[21] Appl. No.: 530,760

[22] Filed: May 30, 1990

[51] Int. Cl.⁵ .................. H04N 7/08; H04N 11/06
[52] U.S. Cl. ..................................... 358/12; 358/141
[58] Field of Search ............... 358/12, 140, 141, 14, 358/135, 23

[56] References Cited

U.S. PATENT DOCUMENTS 4,631,574 12/1986 LoCicero ................. 358/12
4,661,850 4/1987 Strolle ..................... 358/140

Primary Examiner—Tommy P. Chin
Attorney, Agent, or Firm—Rothwell, Figg, Ernst & Kurz

[57] ABSTRACT

A signal transmission system for high definition television that can handle a second television signal which is superior in quality to a first television signal such as an NTSC (National Television System Committee) television signal. The transmitting end of the system transmits a first television signal including a video signal, audio signals, etc., through a main transmission line, as well as a third television signal including a high definition components obtained as the difference between the second and the first television signal through an auxiliary transmission line. The receiving end of the system receives and synthesizes the first television signal transmitted through the main transmission line and the third television signal transmitted through the auxiliary transmission line to produce the second television signal.

20 Claims, 9 Drawing Sheets

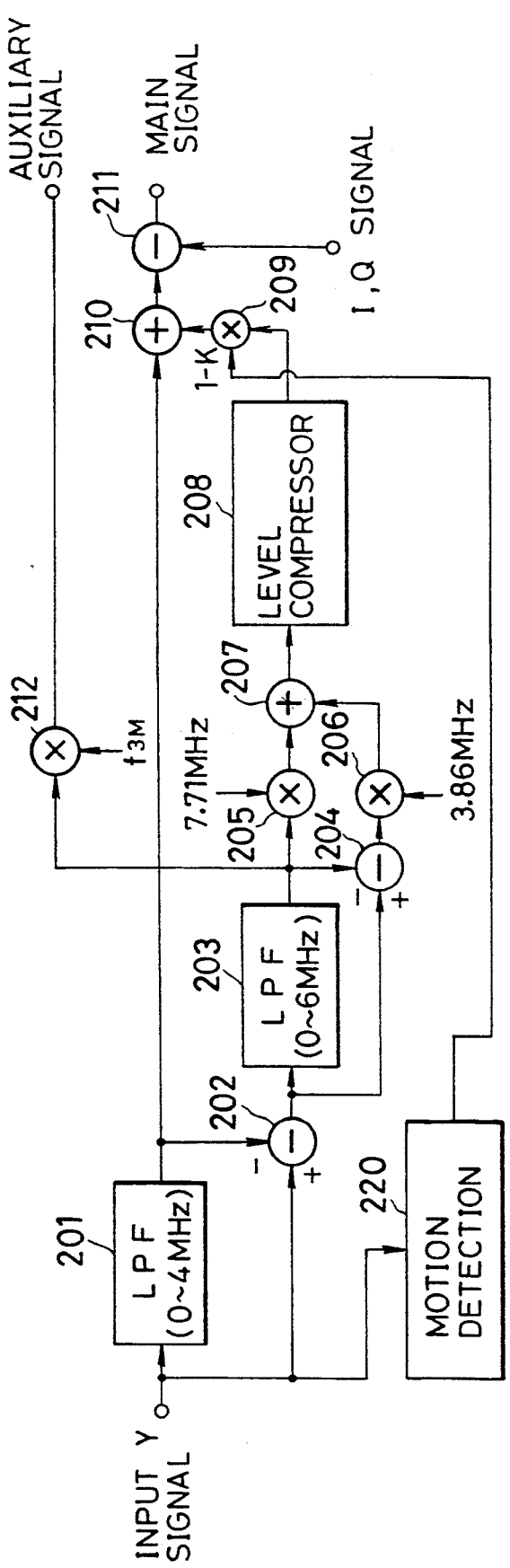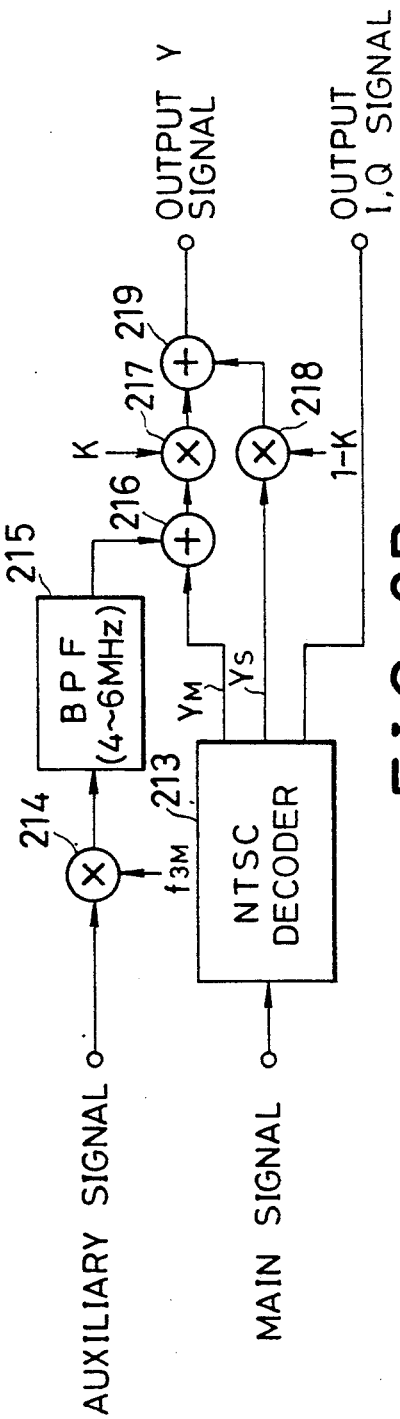

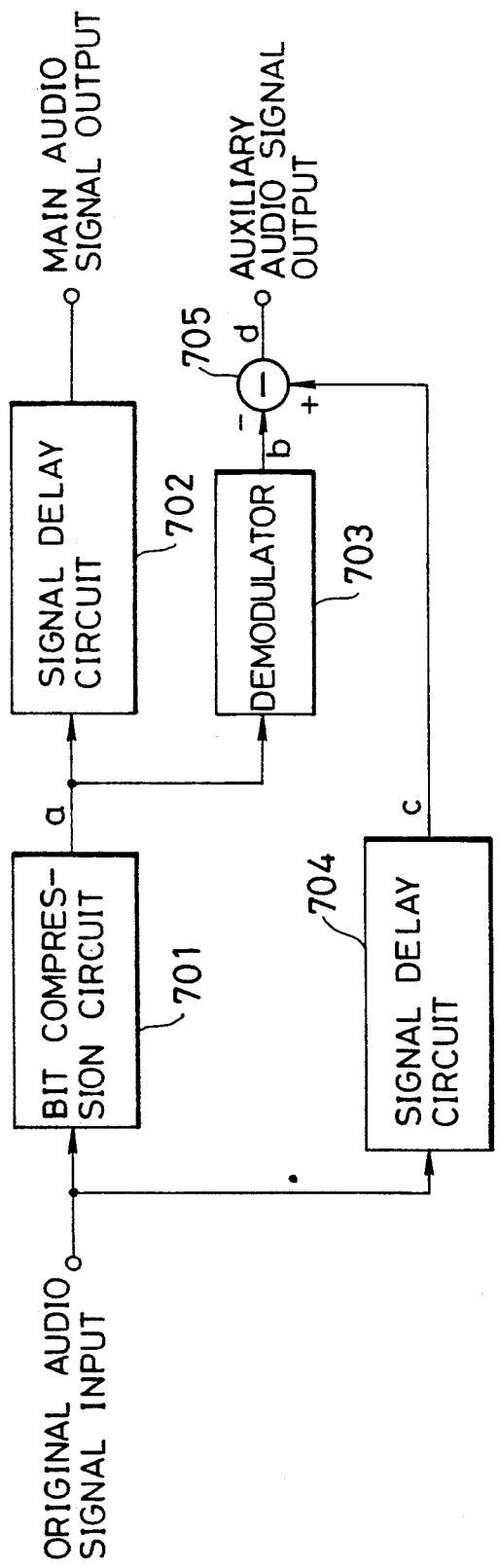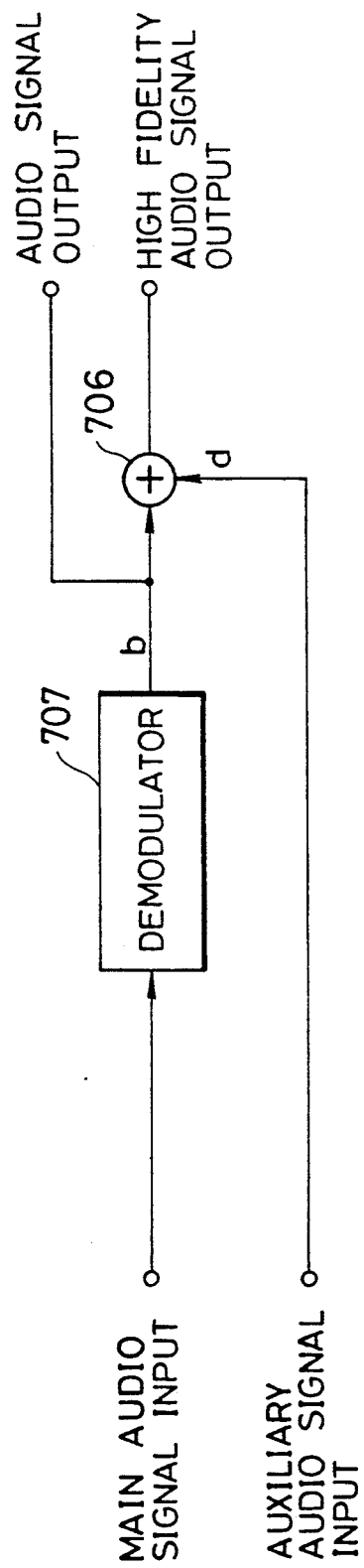
FIG. 7A
FIG. 7B

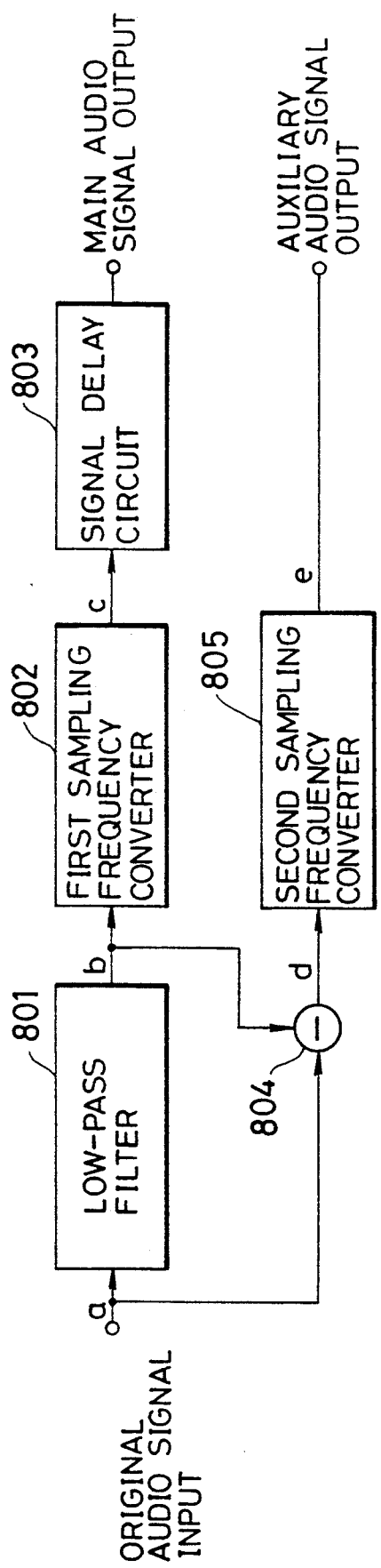
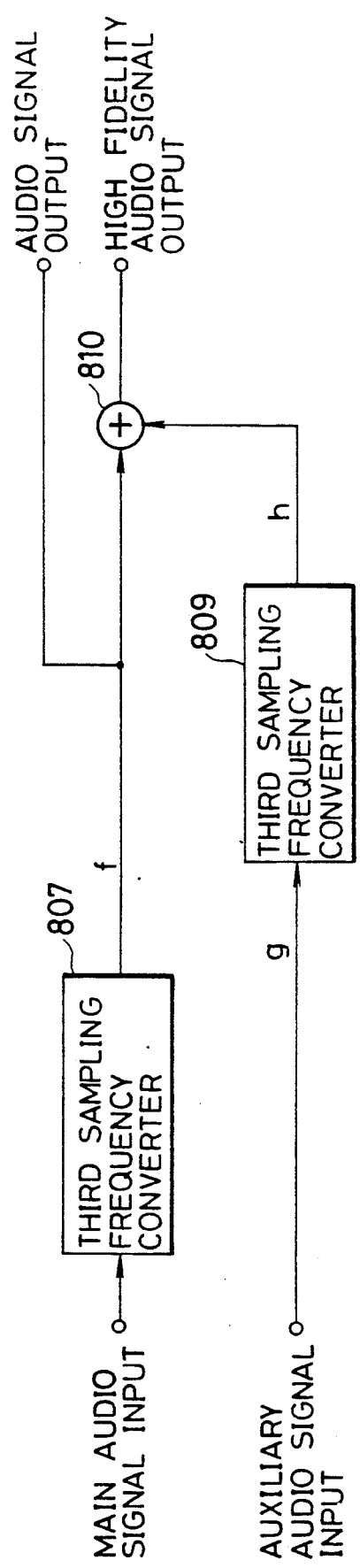
FIG. 8A
FIG. 8B

SIGNAL TRANSMISSION SYSTEM FOR HIGH DEFINITION TELEVISION

BACKGROUND OF THE INVENTION

1. Field of the Invention

The present invention relates to a signal transmission system for high definition television that can restore a second television signal which is superior in quality to a first television signal such as an NTSC (National Television System Committee) television signal: the transmitting end of the system transmits a first television signal including a video signal, audio signals, etc., through a main transmission line, as well as a third television signal including a high definition components obtained as the difference between the second and the first television signal through an auxiliary transmission line; the receiving end of the system receives and synthesizes the first television signal transmitted through the main transmission line and the third television signal transmitted through the auxiliary transmission line to produce the second television signal.

As the first television signal transmitted through the main transmission line, there are a video signal and an audio signal according to the NTSC standard television system. On the other hand, there is a preferable television signal compatible with NTSC signal. Although this television signal is similar to the standard television signal in the bandwidth of a transmission line, and in the transmission signal format, the television signal can be transmitted as a high definition television signal by using various band compression techniques.

2. Description of the Prior Art

A television system so-called an ATV system (Advanced Television System) has been proposed mainly by USFCC. This is a series of transmission systems of high definition televisions compatible with the conventional NTSC system. Various types of systems are researched and proposed at the present time. In the video signal in one of those ATV systems, a high frequency component of a stationary picture are multiplexed with a low frequency component by the three dimensional signal processing or the like: the component higher than 4 MHz in a luminance signal of the stationary picture is multiplexed into four interframe intervals in the form of subsampled data or the like; and then, a vertical high-band component of the luminance signal and the high-band component of chrominance signal (higher than 1.5 MHz for I signal, and higher than 0.5 MHz for Q signal) are superposed onto upper and lower masking portions formed by the upper and lower masking method, and are transmitted.

With respect to the processing of the video signal of this example, pending U.S. patent application Ser. No. 07/498,778, entitled "Receiver And Channel Compatible Encoding/Decoding System for High Definition Video" was filed on Mar. 26, 1990 by the same inventors of the present invention. As to the processing of the audio signal, another U.S. patent application Ser. No. 07/499,874 entitled "Method and System for Transmitting and Receiving PCM Audio Signals in Combination With A Video Signal" was filed on Mar. 27, 1990 by the same inventors of the present invention (now U.S. Pat. No. 5,072,297, issued Dec. 10, 1991). Details of respective matters are given therein. In the video signal of the above example, a vertical high-band component and a horizontal high-band component of the luminance signal higher than the television signal of the NTSC system, and high-band component of the chrominance signal are extracted from a wide-band input television signal (a second television signal); the extracted components are multiplexed into the low-band component of the wideband television signal corresponding to the NTSC television signal with maintaining the bandwidth thereof, and then transmitted.

On the other hand, with regard to the audio signals of the above example, at least the same contents of the audio signals transmitted by FM modulation in the NTSC system are pulse-code-modulated (PCM), are multiplexed into the blanking interval of the video signal after the bit compression, and are transmitted together with the FM modulated audio signals. When the code error rate is small on the transmission line, demodulated PCM (pulse-code-modulated) audio signals are produced as audio signals. Accordingly, using the video signal and the audio signal transmission systems proposed by the above-mentioned U.S. patent applications makes it possible to transmit the video signal and the audio signals having much higher definition compared with those of the NTSC television system within the same transmission bandwidth as that of the NTSC system. The video and audio signals multiplexed and bit compressed by the above processing in the transmission systems, however, are inferior in grade to the original signals.

SUMMARY OF THE INVENTION

Therefore, an object of the present invention is to provide a signal transmission system for high definition television that can provide high definition video and audio signals: at the transmitting end, the video and audio signals having the same transmission bandwidth as that of the NTSC television system is transmitted through the main transmission line, and at the same time, the video and/or audio signal components corresponding to the difference in grade between the broadband and standard television signals are produced and transmitted through the auxiliary transmission line; at the receiving end, those signals on the main and auxiliary transmission lines are synthesized to produce the high definition video and audio signals.

More specifically, a first object of the present invention is to provide a system in which the high definition television video signal is divided into a first video signal and a third video signal, the former corresponding to a conventional television signal (for example, an NTSC video signal), and the latter corresponding to the remaining component of the high definition video signal. The first video signal is transmitted through the main transmission line the bandwidth of which is equal to that of a common television video signal, whereas the third video signal is transmitted through the auxiliary transmission line the bandwidth of which is narrower than the bandwidth of the main transmission line, thereby restoring at the receiving end the high definition video signal by using the signals transmitted on the main and auxiliary transmission lines.

A second object of the present invention is to provide a signal transmission system for high definition television in which the audio signal of the high definition television signal is divided into a first audio signal and a second audio signal: the first audio signal being produced by applying a predetermined data compression on the audio signal of the high definition television signal; the second audio signal corresponding to the components that would be lost by the data compression. The first and second audio signals are transmitted through the main and auxiliary transmission lines, respectively. Thus, the high fidelity audio signal is restored at the receiving end by using these audio signals transmitted on the main and auxiliary transmission lines.

BRIEF DESCRIPTION OF THE DRAWINGS

FIGS. 2A and 2B are block diagrams showing a first embodiment of the video signal processing portion of the present invention;

FIGS. 7A and 7B are block diagrams showing a first embodiment of the audio signal processing portion of the present invention; and FIGS. 8A and 8B are block diagrams showing a second embodiment of the audio signal processing portion of the present invention.

DETAILED DESCRIPTION OF PREFERRED EMBODIMENTS

Figure 1A:
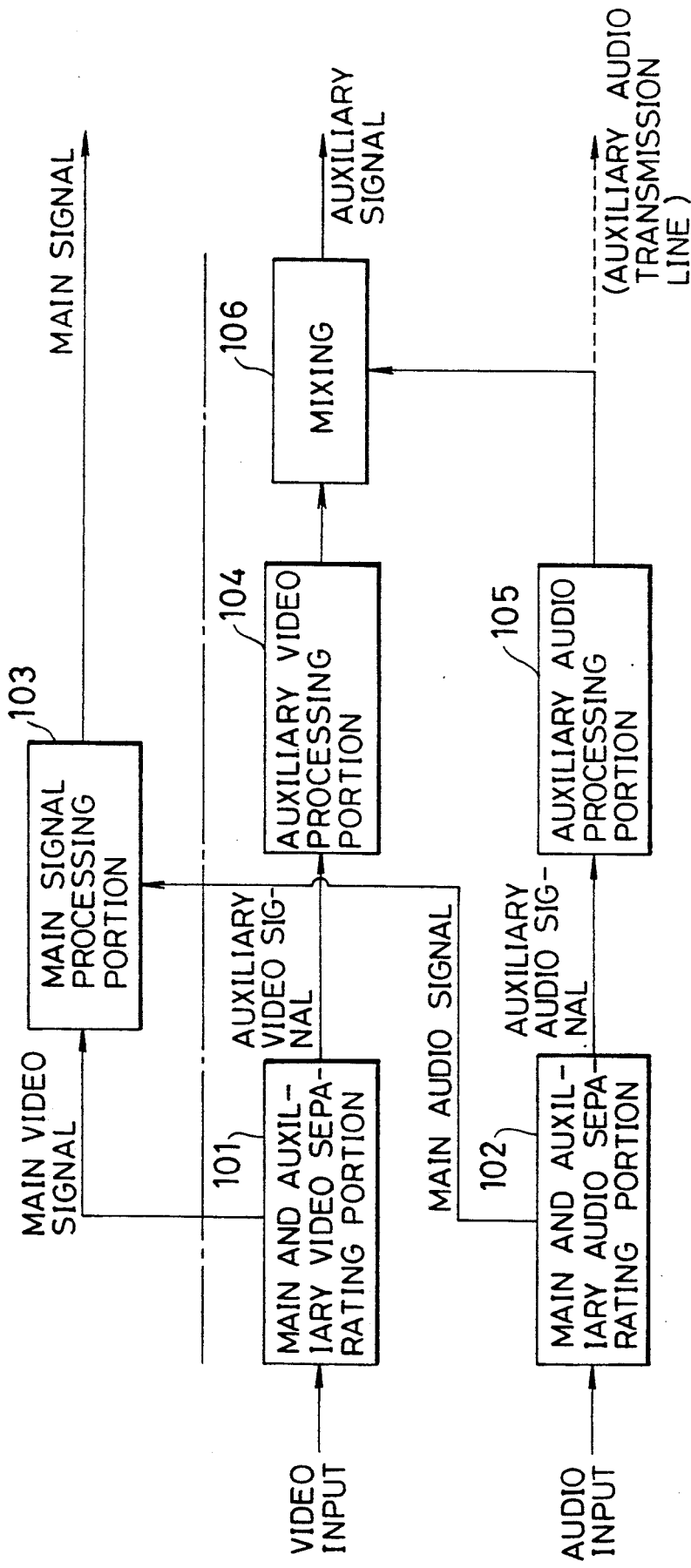
FIGS. 1A and 1B are block diagrams schematically showing an entire arrangement of the present invention.
Figure 1B:
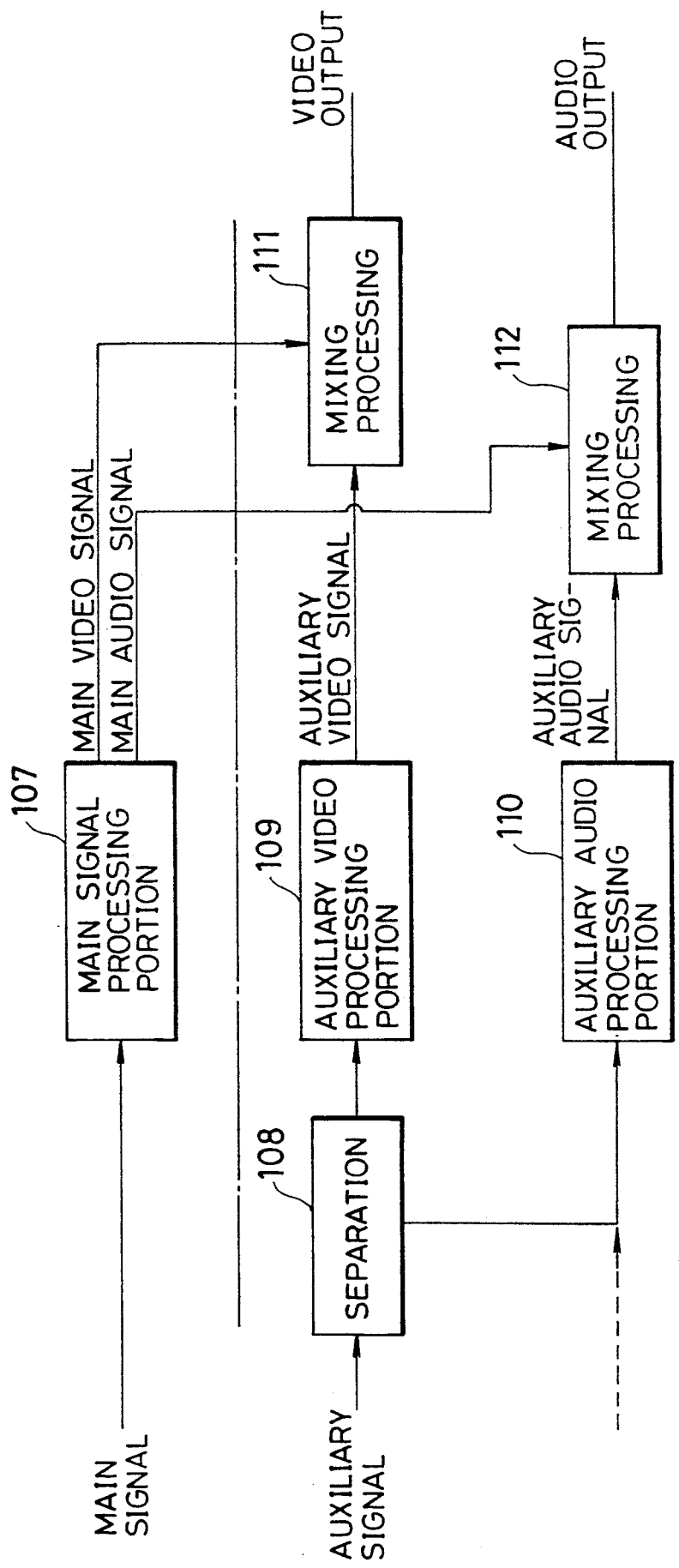

FIGS. 1A and 1B schematically show an entire configuration of the present invention. In FIG. 1A, the input video and audio signals of the high definition television signal are applied to a main and auxiliary signal separating portions 101 and 102, respectively, and are separated into a main signal and an auxiliary signal. The separated main signal and the auxiliary signal are applied to a main signal processing portion 103. The signal processing carried out in this main signal processing portion 103 is described in detail in such U.S. patent application as mentioned above, and the abstract thereof is as follows. The main transmission line has the same bandwidth as that of the NTSC video signal. The main video signal inputted to the main signal processing portion 103 is composed of the following components: the video signal having the format and bandwidth of the common NTSC signal extracted from the wideband television signal; vertical and horizontal high-band components of the luminance signal; and high-band component of the chrominance signal. These signals are processed by using the frequency multiplexing method, and time-axis-compression-and-time-division-multiplexing method so that they can be contained within the bandwidth of the aforementioned main transmission line.

Although the video signal sent out of the main transmission line maintains much higher definition compared with the common NTSC signal, the video signal is inferior to the above-mentioned wideband television signal particularly in the high-band components of the video motion data. Because of this, the high-band signal of the motion data of the wideband television signal is extracted as the auxiliary video signal in the main and auxiliary video separating portion 101, and is applied to the auxiliary video processing portion 104. Thus, the auxiliary video signal is processed to fit to the transmission on the auxiliary transmission line. The processed auxiliary video signal is combined with the auxiliary audio-relating signal mentioned below in a mixer 106, and then sent out to the auxiliary transmission line.

On the other hand, the audio input signal is divided into a main audio signal and an auxiliary audio signal in a main-auxiliary audio separating portion 102. The processing of the main audio signal in the main signal processing portion 103 is described in detail in the aforementioned application papers for U.S. patent. The main audio signal, for example, is multiplexed within the blanking interval of the video signal after it is subjected to the PCM, the bit compression, and the like. Although the main audio signal has nearly enough grade by itself, some information omission from the input audio signal has occurred in the aforementioned process. The omission data is extracted as the auxiliary audio signal in the main and auxiliary audio separating portion 102. This auxiliary audio signal is applied to the auxiliary audio processing portion 105, converted into the signal format suitable to transmission, and then transmitted to the auxiliary transmission line through a mixer 106. The auxiliary audio signal can be transmitted on another auxiliary audio transmission line separately provided from the auxiliary transmission line.

FIG. 1B shows the configuration of the receiving end. The main video signal and the main audio signal are obtained by applying the incoming signal from the main transmission line to the main signal processing portion 107. The detail of the construction and the operation thereof is given in the aforementioned U.S. patent application papers. On the other hand, the signals from the auxiliary transmission line is divided into the signal relating to auxiliary video signal and the signal relating to auxiliary audio signal in the separation circuit 108. They are applied to an auxiliary video processing portion 109 and an auxiliary audio processing portion 110, respectively, so as to be restored as the auxiliary video signal and the auxiliary audio signal. The high definition video signal is obtained by the mixing process of the auxiliary video signal and the main video signal in a mixing processing portion 111. Further, the high definition audio output signal is obtained by the mixing process of the auxiliary audio signal and the main audio signal in a mixing processing portion 112.

The present invention mainly relates to the main and auxiliary video separating portion 101, the auxiliary video processing portion 104, the main and auxiliary audio signal separating portion 102, and the auxiliary audio processing portion 105 of the transmitting end shown in FIG. 1A, as well as relates to the auxiliary video processing portion 109, the mixing processing portion 111, the auxiliary audio processing portion 110, and the mixing processing portion 112 of the receiving end shown in FIG. 1B. Explanation of these elements will be given below.

1. Explanation of Encoding and Decoding of High Definition Video Component:

A specific arrangement to accomplish the first object of the present invention will now be given focusing on encoding and decoding of the high definition video signal components by means of the main and auxiliary video separating portion 101, the auxiliary video processing portion 104, the auxiliary video processing portion 109, and the mixing processing portion 111 shown in FIGS. 1A and 1B.

1.1. First Embodiment

A first embodiment is characterized in that the high-band component of the motion data of the high definition television signal is transmitted through the auxiliary transmission line as the high definition video component, and is received and restored.

Detailed explanation of the present embodiment will be given referring to FIGS. 2A and 2B hereinafter.

FIGS. 2A and 2B are block diagrams of configurations of the transmitting end and the receiving end, respectively.

First, at the transmitting end shown in FIG. 2A, the luminance Y signal of the high definition television signal (abbreviated "HDTV signal" hereinafter) is divided into three frequency bands of 0-4 MHz, 4-6 MHz, and 6-8 MHz. This is performed by two low-pass filters, LPF 201 (0-4 MHz) and LPF 203 (0-6 MHz), and two subtracters 202 and 204.

Here, it is assumed that the input Y signal has a base band frequency from 0 to 8 MHz. In the main transmission system, the frequency components from 4 to 6 MHz and from 6 to 8 MHz of the Y signal are modulated by multipliers 205 and 206, respectively. These modulated signals pass through an adder 207 and a level compressor 208, and is multiplied by $(1-k)$ by a multiplier 209. The value k is selected according to the magnitude of the motion signal. The output of the multiplier 209 is added by an adder 210 to the low frequency component from 0 to 4 MHz of the Y signal. Moreover, an adder 211 multiplexes the I and Q signals with the output of the adder 210. Here, the motion signal k ($0<k<1$) is determined depending on the magnitude of the difference between the video signals of any two adjacent fields, and is detected by a motion detection circuit 220. The motion signal is zero when an image is completely stationary, and is 1 when an image is completely dynamic. The definite construction and operation of the motion detection circuit 220 is described in detail, for example, in U.S. Pat. No. 4,760,446 entitled "Method and Apparatus for Detecting the Motion of Image in a Television Signal". Here, the I signal component of 0-1.5 MHz is vestigial-sideband-modulated by a carrier of (3.58 MHz $+\pi/2$), and the Q signal component of 0-0.5 MHz is modulated by a carrier of 3.58 MHz. Furthermore, the Y signal of 4-8 MHz is sampled and multiplexed so as to overlap onto the 2-4 MHz band of the low-band component together with the carrier chrominance signal as described in the aforementioned U.S. patent application papers. In addition, the 4-6 MHz component of the Y signal is extracted by the LPF 203, and is modulated by a multiplier 212 the carrier frequency $f_{3M}$ of which is 3 MHz, thereby to be transmitted by the auxiliary transmission line of 3 MHz band.

Next, at the receiving end shown in FIG. 2B, a Y signal (Ys) of a stationary picture and a Y signal ($Y_M$) of a motion picture portion are restored from the signal received from the main transmission line. This is performed in an NTSC decoder 213 by using the difference in the frequency band of these signals. Here, the signal Ys has a band from 0 to 8 MHz, and the signal $Y_M$ a band from 0 to 4 MHz. On the other hand, from the signal fed by the auxiliary transmission line, the 4-6 MHz component of the motion picture information in the Y signal is restored through a multiplier 214 (X $f_{3M}$) and a BPF (band pass filter; 4-6 MHz) 215, and is added to the signal $Y_M$ by an adder 216. Further, the signal Ys, and the signal $Y_M$ added to the output of BPF 215 are multiplied by k and $1-k$ by multipliers 218 and 217, respectively. The k represents the magnitude of the motion signal which is separately detected. The outputs of the multipliers 217 and 218 are added by an adder 219 to generate a final Y signal. This final Y signal includes a high-definition component (4-6 MHz) of the motion picture.

As is clearly seen from FIGS. 2A and 2B, the compatibility with the NTSC signal can be achieved even when the auxiliary transmission line is not used. In the case where the auxiliary transmission line is not used, only the moving resolution corresponding to the high-band component of a motion picture is deteriorated.

In the embodiment mentioned above, the bandwidth of the signal on the main transmission line is equal to that of the NTSC transmission system; the signal transmitted through the auxiliary transmission line is the 4-6 MHz component of the motion picture information in the luminance signal of the HDTV signal; and the 4-6 MHz component of the stationary picture information of the HDTV luminance signal is multiplexed in such a manner that the 4-6 MHz component is sampled and overlaps onto the 2-4 MHz band of the low-band component of the Y signal. The present invention, however, should not be limited only to this; various modifications and revisions are also possible using such multiplexing technique as described in the aforementioned U.S. patent application papers, or the like.

In the existing HDTV signal transmission systems compatible with the conventional systems, although sufficient resolution can be achieved with the stationary picture by an HDTV receiver, the resolution of the motion picture is insufficient. According to the present embodiment, however, it is possible to transmit the high-band information of the motion picture through the auxiliary transmission line. This increases the grade of the restored HDTV picture.

1.2. Second Embodiment

In the first embodiment of the present invention, the high definition television information is transmitted using the main transmission line and the auxiliary transmission line: the former corresponds to such a transmission line as that of the NTSC system having insufficient capacity to transmit the HDTV information; and the latter transmits the high-band component of the motion picture information.

The second embodiment of the present invention is characterized in that it transmits the information other than the high definition television information through the auxiliary transmission line so as to achieve effective use thereof, when the high definition television information to be transmitted is decided to be the stationary or quasi-stationary picture.

Figure 3A:
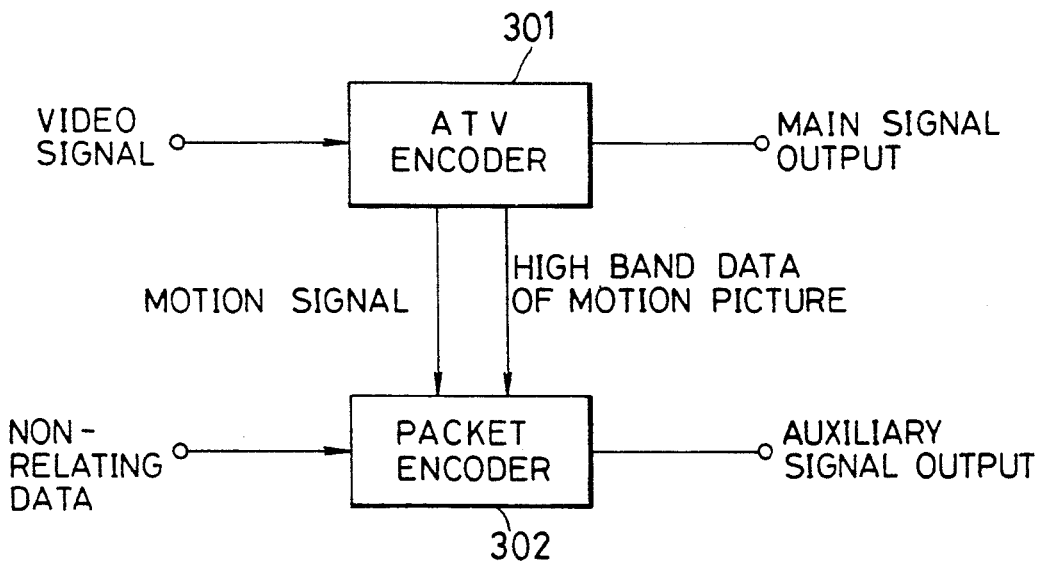
FIGS. 3A and 3B are block diagrams showing a second embodiment of the video signal processing portion of the present invention.
Figure 3B:
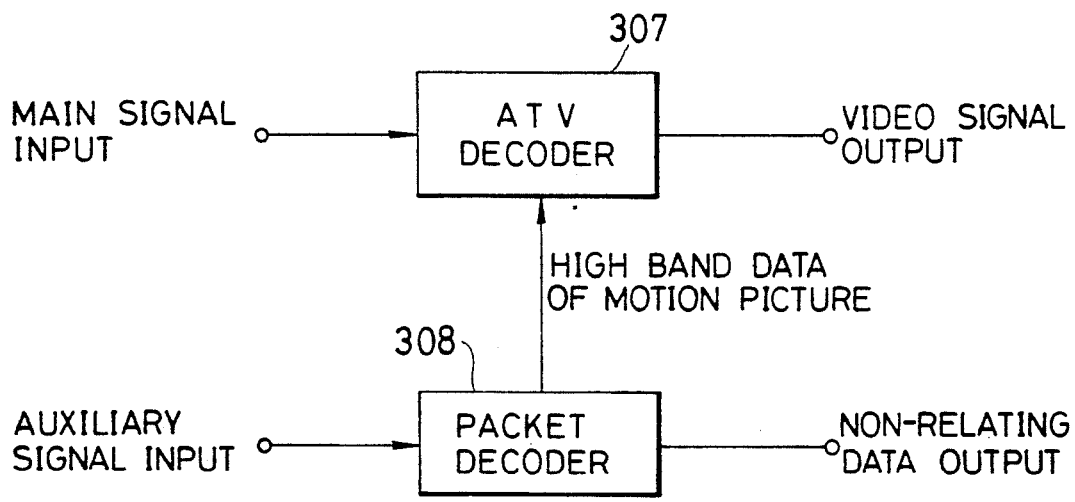

A configuration of a system for effective use of the auxiliary transmission line relating to the second embodiment is shown in FIGS. 3A and 3B.

The transmitting end in FIG. 3A has an ATV encoder 301 and a packet encoder 302. The motion signal and the high-band information of the motion picture produced from the ATV encoder 301 decide whether the high-band information of the motion picture or non-relating information other than the video signal should be transmitted through the auxiliary transmission line; in either case, the information is packetized by the packet encoder 302, and is transmitted through the auxiliary transmission line, after it is modulated by a 3

MHz modulator. In this example, the bandwidth of the main video signal for the main transmission line is the same as that of the standard NTSC transmission system, i.e., 6 MHz, and the bandwidth of the auxiliary video signal for the auxiliary transmission line is one half of that in the frequency, i.e., 3 MHz. Thus, each signal is transmitted after the processing such as modulation suitable for each transmission line.

The receiving end of FIG. 3B has an ATV decoder 307 for decoding the video signal from the received signal, and a packet decoder 308 for separating the packet data sent through the auxiliary transmission line into the non-relating data and the high-band information of the motion picture. The signal from the main transmission line and the signal from the auxiliary transmission line pass through respective demodulators before they reach the ATV decoder 307 and the packet decoder 308, respectively. A motion signal detecting means at the receiving end is provided in the ATV decoder 307, and a means for detecting the high-band information of the motion picture is in the packet decoder 308.

The above-mentioned non-relating information can be replaced with the extended information of the stationary picture, which is produced by extending the high-band information of the stationary picture when the high-definition television signal to be transmitted includes only the information of completely stationary picture. In contrast, when the non-relating information itself is transmitted, any digital data can be transmitted by packetizing them according to the vacant capacity of the auxiliary transmission line. If a memory is prepared in the receiver, the transmitted information can be stored so that it is restored in a convenient timing. As the non-relating information, a stationary picture, character data, or music performance data can be handled. In this case, it is necessary to transmit data for every field for discriminating whether the information of the main transmission line is of a complete stationary picture, and the non-relating data is transmitted or not.

Furthermore, when the non-relating information is transmitted because the high definition television information includes little data involving motion, it is preferable that each field be divided into several blocks so that each block is packetized and transmitted. In this case, each block is judged whether it includes a stationary portion or moving portion so that the non-relating data can be transmitted under the entirely stationary condition. It is also possible to add to the tag of the packet the information indicating the utilizing condition of the packet, for example, whether the non-relating data is under transmission or not.

As is described hereinbefore, according to the present embodiment, the high-band information of the motion picture of the HDTV signal can be transmitted, effectively utilizing the transmission band of the auxiliary transmission line.

1.3. Explanation of Transmitting System of High-Band Component of the Video Signal:

As one of the aforementioned ATV systems, the bandwidth of the main transmission line of the system of the present invention must be compatible with the bandwidth of the NTSC system. With regard to the auxiliary transmission line, on the other hand, there is freedom, and so an arrangement for effective transmission and reception of the main and auxiliary video signals is possible, in particular, when the auxiliary transmission band has a bandwidth of about 3 MHz, and is continuous with the frequency band of the main transmission band.

The transmission system of the present invention separates from the high definition television signal the high definition video component which would be located beyond the transmission band of, for example, the NTSC system; modulates the separated component by such a carrier that the lower sideband falls in the frequency band above the audio carrier of frequency fv; and after that, adds only the lower sideband to the lower frequency component below 4.2 MHz to produce the main and auxiliary video transmitting signals.

As a result, the high definition television signal can be transmitted through the 9 MHz main and auxiliary transmission lines the radio frequency bands of which are continuous, with maintaining compatibility with receiving apparatuses of the conventional NTSC system without changing but the radio-frequency stages of the transmitting and receiving apparatuses of the NTSC system.

The conventional NTSC system has an audio carrier of 4.5 MHz just above the video signal band of 4.2 MHz. This prevents the transmission of the high definition video and audio signals with maintaining compatibility with conventional receivers of the NTSC system, even if a transmission line having a continuous 9 MHz frequency band can be available. Alternatively, a method may be possible which mixes the 3 MHz signal for the auxiliary transmission line with the conventional 6 MHz high-frequency band at the radio-frequency stage; however, it has a drawback that it requires a great change of the existing transmitting facility. Therefore, the transmission system described below according to the present invention makes sense.

1.3.1. Third Embodiment

Figure 4A:
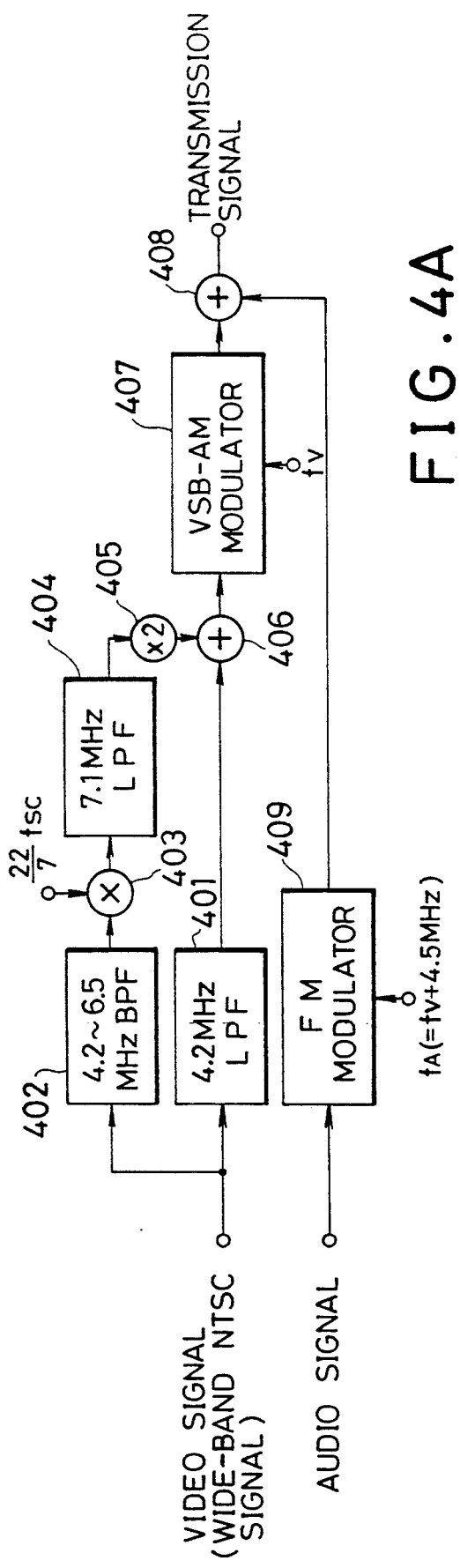
FIGS. 4A and 4B are block diagrams showing a third embodiment of the present invention.
Figure 4B:
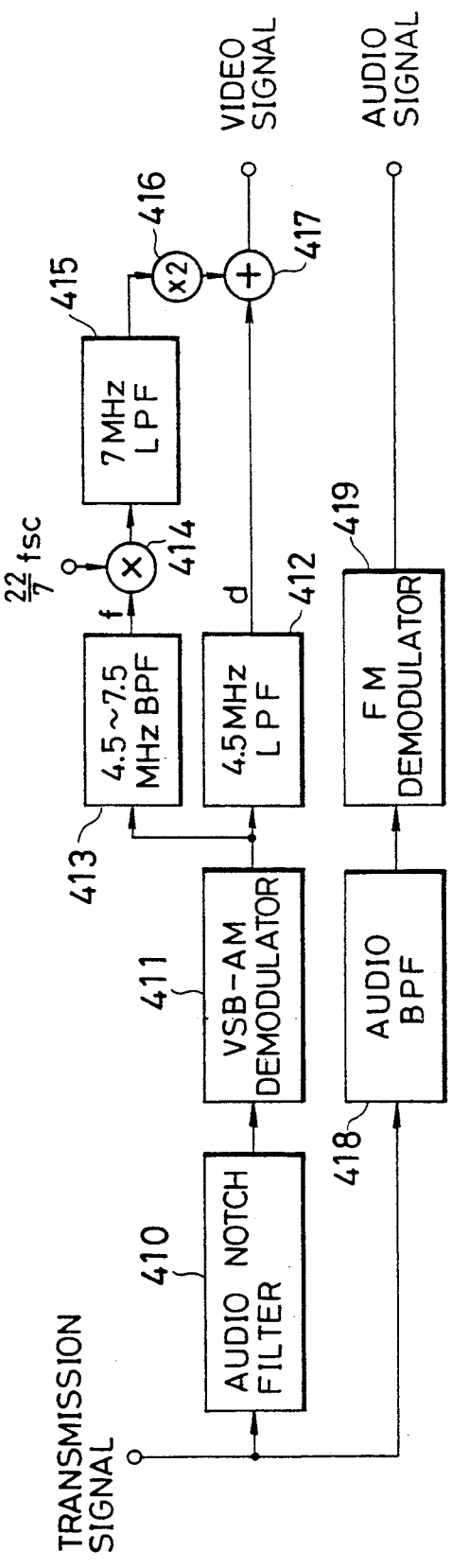

FIGS. 4A and 4B are block diagrams of a specific configuration of the transmission system for the high definition video component according to the present invention.

In FIG. 4A, the input signals are the video signal and the audio signal. The video signal is, for example, the wideband NTSC signal. This NTSC signal is divided into a low-band component and a high-band component by a 4.2 MHz LPF (Low-Pass Filter) 401 and a 4.2–6.5 MHz BPF (Band-Pass Filter) 402, respectively: the low-band component is lower than 4.2 MHz equal to the NTSC transmission band; and the high-band component is higher than that. The high-band component, the output from the BPF 402, is amplitude modulated onto the carrier of a frequency of 22/7 X fsc (fsc is a subcarrier frequency of the NTSC color signal) by the modulator 403. As a result, the high-band component of 4.2–6.5 MHz is converted to a lower sideband of 4.8–7.1 MHz and an upper sideband of 15.5–17.8 MHz since the carrier frequency of 22/7 X fsc is about 11.3 MHz. Only the lower sideband is taken out from those with the 7.1 MHz LPF 404, and is added to the output of the LPF 401, i.e., the low-band component, by the adder 406 after being multiplied by 2 in the multiplier 405 for adjusting the level to the low-band component. The output of the adder 406 becomes the baseband video transmission signal.

The output of the adder 406 is modulated onto the video carrier signal fv by a VSB-AM modulator 407 in the same manner as the NTSC signal. This modulator 407 can be a conventional modulator slightly modified by changing the conventional high-band of 6 MHz to 9 MHz. The audio signal is FM modulated onto an audio carrier the frequency of which is $f_A = f_V + 4.5$ MHz by an FM modulator 409 in the same manner as that of the NTSC system. The video signal and the audio signal outputted from the modulators 407 and 409 are added by an adder 408, and the output of the adder 408 becomes the transmission signal.

FIG. 4B is a block diagram of a configuration at the receiving end of the embodiment. The received input signal is separated into the video signal and the audio signal through an audio notch filter 410 and an audio BPF 418. The audio signal, the output of the audio BPF 418, is demodulated by an FM demodulator 419 to a baseband audio signal in the same manner as in the NTSC system. The video signal, the output of the audio notch filter 410, is demodulated to the baseband video signal by a VSB-AM demodulator 411. A conventional modulator can be used as the demodulator 411 without changing but the high frequency bandwidth from 6 MHz to 9 MHz. The output of the demodulator 411 is divided into two parts through the 4.5 MHz LPF 412 and 4.5-7.5 MHz BPF 413, with 4.5 MHz as the boundary which corresponds to the baseband frequency of the audio carrier $f_A$: the low-band component d lower than 4.5 MHz and the high-band component f higher than 4.5 MHz. The high-band component f, the output from the BPF 413, is demodulated by the demodulator 414 using the carrier in synchronism with that of the transmitting end, the frequency of the carrier being 22/7 × fsc. The demodulated signal is deprived of the double frequency component produced by the synchronous detection through the 7 MHz LPF 415, and is added to the low frequency component d by an adder 417 after being multiplied by 2 by a multiplier 416 for adjusting the level to that of the low-band component. The output of the adder 417 becomes the video signal output.

Figure 5:
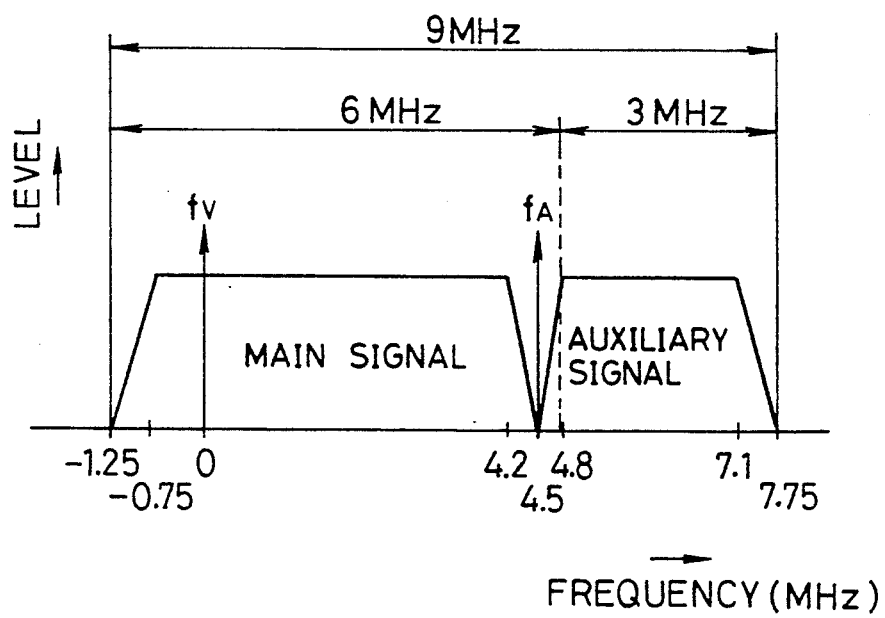
FIG. 5 is a graph illustrating the spectrum of the transmission wave produced by the circuit shown in FIG. 4A.

FIG. 5 shows a spectrum of the transmission signal according to the circuit shown in FIG. 4A. The frequency of the x-axis is represented by the offset with respect to the video carrier frequency $f_V$ set as zero. First, the video signal in the frequency band from −1.25 to 4.5 MHz and the audio carrier $f_A$ of 4.5 MHz (and the sideband thereof) are completely identical to those of the conventional NTSC system. As a result, the transmission signal of the spectrum shown in FIG. 5, if applied to a conventional NTSC receiver, can be restored to images in the same manner as the conventional signal with maintaining the compatibility because the transmission signal is restricted to the band lower than $f_V + 4.5$ MHz at an IF (intermediate frequency) stage and the like of the ordinary receiver. On the other hand, the receiver shown in FIG. 4B can appropriately handle the signal distributed within the auxiliary video signal band of 4.5-7.5 MHz, thereby restoring the wideband video signal. The high-frequency band of this transmission signal is 9 MHz as apparent from the figure.

A video signal the bandwidth of which is simply broadened from 6 MHz to 9 MHz independently of the present invention cannot be used because it causes crosstalk with the audio carrier. In addition, allocating the auxiliary transmission signal band below the high frequency band will complicate the arrangement of the modulator, because this cannot be achieved by simply extending downward the high frequency band of an ordinary VSB-AM modulator. Similarly, at the demodulation stage, simply broadening the band of a conventional demodulator will cause crosstalk between main transmission signal and the auxiliary transmission signal. Therefore, this method necessitates great changes in the high frequency circuitry of both the transmitting and receiving ends.

Figure 6A:
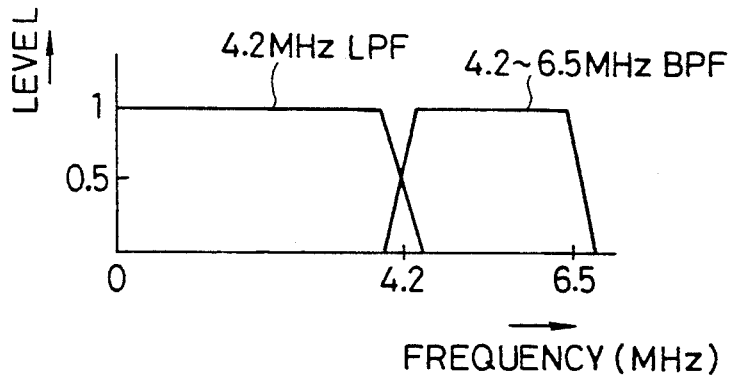
FIG. 6A is a graph illustrating the spectra of the signals outputted from the 4.2 MHz LPF and the 4.2–6.5 MHz BPF of FIG. 4A.
Figure 6B:
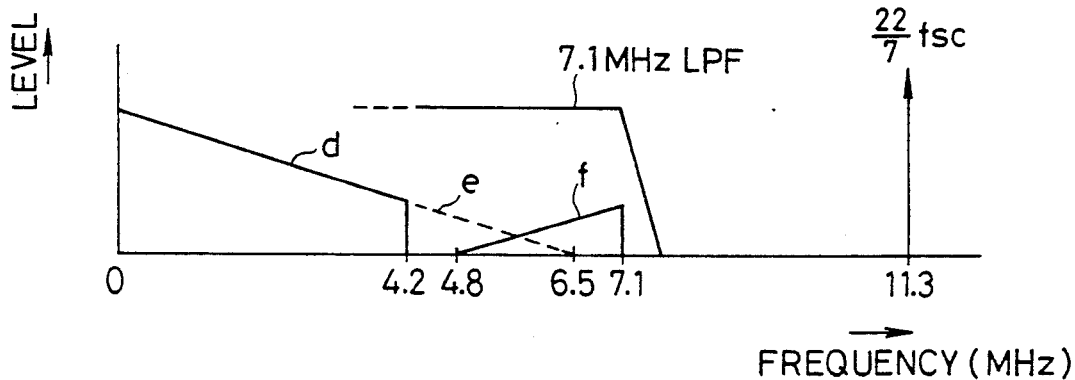
FIG. 6B is a graph illustrating the spectra of the signals d, e, and f in FIG. 4A.
Figure 6C:
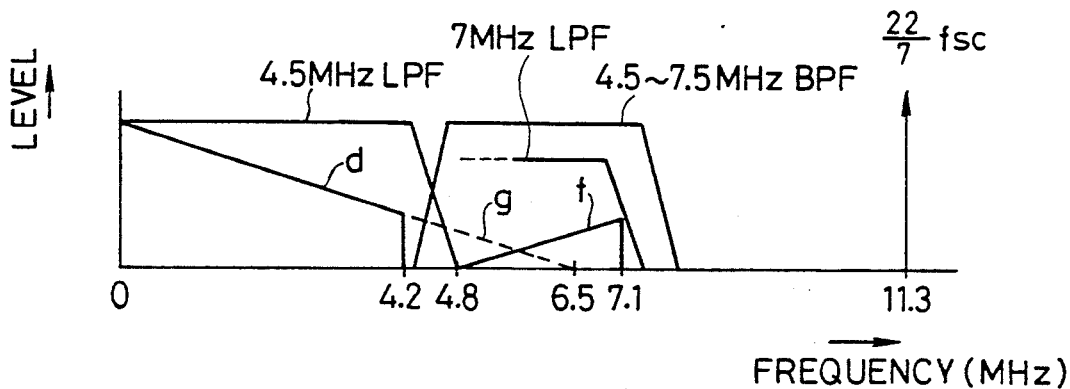
FIG. 6C is a graph illustrating the spectra of the signals d, f, and g in FIG. 4A.

The spectra shown in FIGS. 6A to 6C are given for explaining the signal spectrum processing according to the present invention. FIG. 6A shows characteristics of the 4.2 MHz LPF 401 and the 4.2-6.5 MHz BPF 402 of the configuration shown in FIG. 4A. If the two filters have complementary characteristics around 4.2 MHz, the total transmission characteristics of the transmitting and receiving is flat as far as 6.5 MHz. FIG. 6B shows the behavior of the modulation carried out at the transmitting end. Assuming that the spectrum of the original signal is composed of components d and e extending to 6.5 MHz in the bandwidth as shown in this figure, only the component higher than 4.2 MHz is amplitude modulated onto the carrier of 22/7 × fsc, and the lower sideband appears from 4.8 to 7.1 MHz. The unnecessary upper sideband appearing from 15.5 to 17.8 MHz is eliminated by the 7.1 MHz LPF 404 of FIG. 4A as shown in FIG. 6B so that only the lower sideband is multiplied by 2 (thus, the component f in FIG. 6B is obtained), and is added to the low-band component d. As a result, the transmission signal according to the present invention is produced.

Referring to FIG. 6C, at the receiving end, the main signal in the transmission signal are divided into the low-band component d and the additional signal f by the 4.5 MHz LPF 412 and the 4.5-7.5 MHz BPF 413 as shown in FIG. 4B. These filters 412 and 413, for example, have characteristics as shown in FIG. 6C. The original high-band component g is obtained by demodulating the component f with the carrier of 22/7 × fsc synchronized with that of the transmitting end. The demodulated component is restricted in bandwidth by a 7 MHz LPF 415 shown in FIG. 4B to eliminate the components higher than the double frequency produced by the synchronous detection. The LPF 415, for example, has characteristics shown in FIG. 6C. After that, the output of the demodulator 414 is multiplied by 2 so that the level thereof matches with that of the low-band component d. The video signal of 6.5 MHz band, which is equal to the input signal to the transmitting end, can be obtained by adding the components g and d.

The carrier the frequency of which is 22/7 × fsc is used to modulate the high-band component. This is because it has an appropriate frequency value with a simple integer ratio in respect to fsc, so that the phase synchronization becomes easy. Furthermore, the lower sideband produced by the modulation with the aforementioned carrier is used in the present invention. This is because using the upper sideband presents practical difficulties. For example, as is shown in FIG. 5, using the 2/7 × fsc (about 1.0 MHz) as the carrier for the high-band component produces the upper sideband falling in nearly suitable frequency band from 5.2 to 7.5 MHz. The lower sideband, however, appears from 3.2 to 5.5 MHz thereby causing crosstalk between the upper sideband. If the bandwidth of the original signal is restricted to about 6 MHz, the upper sideband and the lower sideband can be separated from each other. However, since the separation between these frequencies is narrow, a filter having considerably steep characteristics is required. Although this problem can be fairly improved by adjusting the carrier frequency, there is a tendency to narrow the transmission bandwidth to less than 6 MHz.

2. Explanation of High Definition Audio Component Transmission:

Specific transmitting and receiving apparatuses will be described which can accomplish the second object of the present invention by handling the high definition audio component or the auxiliary audio signal. The information compression method of the main audio signal adapted here is an amplitude (dynamic range) compression and a frequency axis (bandwidth) compression. The auxiliary audio signal, that is, the deleted components by the respective compressions, will be described with embodiments.

Incidentally, there is a conventional, known technique in which an audio signal is separately transmitted through a plurality of transmission lines, and the original audio signal is restored by adding the received signals at the receiving end. The conventional technique, however, is only for the purpose of transmitting high quality audio signal containing a great deal of data by combining several transmission lines of small transmission capacity, and hence the separation technique is simple. In this case, even a line failure of one of the plurality of transmission lines hinders the correct data transmission.

In contrast with this, in the present invention, the audio signal transmitted by the main line is sufficient to restore fairly good sound quality. Moreover, the additional high definition information, which cannot be transmitted through the main transmission line, but is transmitted through the auxiliary transmission line, makes it possible to restore at the receiving end the high fidelity audio signal that cannot be obtained merely with the signal of the main transmission line.

2.1. First Embodiment Relating to the Transmitting and Receiving of the High Definition Audio Component:

The first embodiment characterized in that it transmits in two ways the high fidelity audio signal with a wide dynamic range which cannot be transmitted by the capacity of the main transmission line: the main part of the audio signal is transmitted by the main transmission line after the bit compression; and the remaining part of the audio signal, that is, the high-band component thereof is transmitted through the auxiliary transmission line. Thus, the following can be accomplished: the high fidelity audio signal of wide dynamic range can be restored using the signals transmitted through both the transmission lines; the compatibility with the receiver for the main transmission line is achieved; and the sound of considerable quality can be restored from the audio signal of the main transmission line even if transmission failure occurs in the auxiliary transmission line.

FIGS. 7A and 7B are schematic block diagrams of the transmitting end and the receiving end of the first embodiment, respectively.

In the construction shown in FIG. 7A, the original audio signal input is assumed to be a high fidelity audio signal of a wide dynamic range. The original audio signal is converted into a bit compressed signal a by a bit compressing circuit 701, and is outputted through a signal delay circuit 702 as the main audio signal for the main transmission line.

Here, the bit compressing circuit 701 can be replaced with a known instantaneous or quasi-instantaneous compressing-and-encoding means or an instantaneous or quasi-instantaneous compressing-and-differential-encoding means, the purpose of which is to compress the dynamic range. The instantaneous compressing-and-differential-encoding means is described in detail in U.S. patent application papers entitled "Differential Code Transmission System" filed on Nov. 21, 1989 by the assignee of the present invention.

The audio signal of considerable quality can be restored by using only the signal transmitted through the main transmission line regardless whether the compressing and encoding method or the compressing and differential encoding method is used because range bits are added to the bit compressed signal to indicate the dynamic range of the original signal. However, in order to restore, at the receiving end, the original signal of a high dynamic range, which has been subjected to the quasi-zero suppression in this bit compression circuit 701, additional data are necessary. This additional data are transmitted through the auxiliary transmission line in the present invention as will be described below.

An appropriate adjustment of the timing of the signal delay circuit 702 can obviate a signal delay circuit that would otherwise be necessary at the receiving end: the signal delay circuit 702 is originally provided for adjusting the transmitting timing of the signals sent through the main and auxiliary transmission lines; on the other hand, at the receiving end shown in FIG. 7B, a further timing adjustment between the signals from the main and the auxiliary transmission lines would be necessary when these signals are added by an adder 706; when the timing adjustment corresponding to the further timing adjustment has been performed beforehand by using the signal delay circuit 702, the signal delay circuit that would be required at the receiving end will be unnecessary. This timing adjustment is preferable for mass production of the receivers, and is included in this embodiment.

Next, the transmission signal supplied to the auxiliary transmission line is formed at the transmitting end as follows: first, a signal a which is bit compressed and produced from the bit compressing circuit 701 is demodulated by a demodulator 703, and is produced as a demodulated signal b; the original audio signal is delayed by a signal delay circuit 704 to adjust timing, and is produced as a signal c; the signals b and c are applied to a difference circuit 705 so that the difference signal d of the two is produced; and the difference signal d is produced as the auxiliary audio signal.

At the receiving end shown in FIG. 7B, the main audio signal is demodulated to the signal b by a demodulator 707. The auxiliary audio signal d and the demodulated signal b are added by an adder 706 to obtain the original high fidelity audio signal. A receiver for only the main transmission line uses only the output from the demodulator 707.

Thus, according to the present embodiment, considerably satisfactory sound quality can be achieved with the information only from the main transmission line. This is because the main transmission line transmits the wide-dynamic-range, high-definition audio signal which is bit compressed and further compressed in only its dynamic range to some extent. Furthermore, the auxiliary transmission line transmits the remaining components of the audio signal that cannot be bit compressed, and this signal is added to the signal transmitted through the main transmission line at the receiving end. Thus, the wide-dynamic-range audio signal can be restored. Moreover, even if transmission failure occurs on the auxiliary transmission line, the sound quality of a certain level can be maintained at the receiving end.

Furthermore, the compatibility with receivers for only the main transmission line can be assured.

2.2. Second Embodiment Relating to Transmitting and Receiving of High Definition Audio Component:

The second embodiment is characterized in that the main transmission line transmits the band limited high fidelity audio signal which originally includes high-band signal components which cannot be transmitted with the transmission capacity of the main transmission line; that the auxiliary transmission line transmits the remaining high-band components; and that the high fidelity audio signal of wide frequency band is restored by using the signals through both the transmission lines, thereby achieving the compatibility with receivers for only the main transmission line, as well as restoration of the audio signal with maintaining a considerably satisfactory sound quality even if transmission trouble occurs on the auxiliary transmission line.

FIGS. 8A and 8B are schematic block diagrams of the transmitting end and the receiving end relating to the second embodiment, respectively.

In FIG. 8A, the input original audio signal a can be an analogue signal, but is preferably a digital signal for the later signal processing, and the sampling frequency thereof is restricted to the frequency higher than the double of the upper limit frequency (Nyquist frequency) of the base band of the audio signal to be transmitted. This input signal is divided into a signal b and a signal d by a low-pass filter 801 and a subtracter 804: the bandwidth of the signal b is restricted to that of the main transmission line; and the signal d has the frequency component higher than this bandwidth. In practice, a signal delay circuit must be provided on the way of the signal a to the subtracter 804 to adjust the timing between signals a and b. The delay circuit, however, is omitted here.

Next, the signal b is converted with the first sampling frequency in a first sampling frequency converter 802. The first sampling frequency is higher than the Nyquist frequency defined by the upper limit frequency of the low-pass filter. The output signal c of the converter 802 is transferred to the main transmission line through a signal delay circuit 803. This signal delay circuit 803 is generally used for adjusting the supply timing of the signals to the main transmission line and the auxiliary transmission line. The delay circuit 803, however, can provide the time delay required for adjusting the timing between a signal f and a signal h applied to an adder 810 of the decoder shown in FIG. 8B. This would be beneficial to simplify the construction of the receiving end, and hence, this time delay is included to the signal delay circuit 803.

On the other hand, the signal d is converted into a signal e with the second sampling frequency of a second sampling frequency converter 805, and the signal e is supplied to the auxiliary transmission line. The second sampling frequency is preferably higher than the Nyquist frequency corresponding to the bandwidth frequency of the high-band component of the input original audio signal.

FIG. 8B is a schematic diagram of the construction of the receiving end. The signal transmitted through the main transmission line is converted with the third sampling frequency of a third sampling frequency converter 807, and is produced as a signal f. This third sampling frequency is preferably higher than the Nyquist frequency corresponding to the upper limit of the transmission bandwidth of the original audio signal.

Likewise, the signal transmitted through the auxiliary transmission line is converted into a signal h with the third sampling frequency in a third sampling frequency converter 809 in the same manner as the signal transmitted through the main transmission line. Thereafter, the output h and the signal f adjusted in timing each other are added by the adder 810. Thus, the high fidelity audio signal is restored. At the same time, the signal f is outputted separately as the audio signal for a receiver for the main transmission line.

It is just enough that the first, second and third sampling frequencies have higher frequencies than the respective predetermined Nyquist frequencies. From the viewpoint of convenience in signal processing, however, it is preferable that the sum of the first and the second frequencies be equal to the third frequency. As an instance for this, the following values are established.

| | |
|---|---|
| Input original audio signal: | bandwidth 20 kHz |
| | sampling frequency 48 kHz |
| Low-pass filter: | upper limit 15 kHz |
| First sampling frequency: | 32 kHz |
| Second sampling frequency: | 16 kHz |
| Third sampling frequency: | 48 kHz |

According to the present embodiment, the wideband high fidelity audio signal is restricted to a predetermined bandwidth before transmitted through the main transmission line. This makes it possible to maintain considerably satisfactory sound quality only by the information transmitted through the main transmission line. Furthermore, the remaining signal component which cannot be transmitted by the restricted bandwidth is transmitted through the auxiliary transmission line, and is added to the signal transmitted through the main transmission line at the receiving end. This makes it possible to restore the wideband audio signal. Moreover, a considerably satisfactory sound quality can be maintained even if a transmission failure on the auxiliary transmission line occurs. Furthermore, the compatibility with a receiver for the main transmission line can be maintained.

What is claimed is:

1. An encoder for encoding a television signal into a main signal to be transmitted by a main transmission line and an auxiliary signal to be transmitted by an auxiliary transmission line, said encoder comprising:

separation means for separating a second television signal having higher definition than a first television signal into a main television signal and an auxiliary television signal, said separation means including a dividing means for dividing said second television signal into a first band corresponding to that of said first television signal and a second band above said first band, said main television signal having a bandwidth corresponding to that of the first television signal, said auxiliary television signal having information, the amount of which corresponds to that of said second band;

main signal processing means for producing said main signal from said main television signal, said main signal having a bandwidth equal to that of said main transmission line; and auxiliary signal processing means for producing said auxiliary signal from said auxiliary television signal, said auxiliary signal having a bandwidth equal to that of said auxiliary transmission line.

2. An encoder as claimed in claim 1, wherein said first television signal and said main television signal are on NTSC television system signal.

3. An encoder as claimed in claim 1, wherein a video component of said main television signal includes at least one of a horizontal high-band component of a luminance signal, a vertical high-band component of the luminance signal, and a high-band component of a chrominance signal of said second television signal.

4. An encoder as claimed in claim 1, wherein an audio component of said main television signal is produced by applying an audio signal to an audio quasi-instantaneous compressing differential PCM.

5. An encoder as claimed in claim 1, wherein an audio component of said main television signal is a signal formed by sampling.

6. An encoder as claimed in claim 1 further comprising motion detection means for detecting motion of images, wherein a video component of said auxiliary television signal includes at least a high-band component of the motion information of images produced in response to the signal from said motion detection means.

7. An encoder as claimed in claim 6, wherein a video component of said auxiliary television signal includes said high-band component of the motion information and other information, the sum amount of said high-band component and said other information being nearly constant.

8. An encoder as claimed in claim 4, wherein an audio component of said auxiliary television signal includes an audio component excluded from said audio signal by said audio quasi-instantaneous compressing differential PCM.

9. An encoder as claimed in claim 5, wherein the audio component of said auxiliary television signal includes an audio component excluded by said sampling.

10. A decoder for decoding a high definition second television signal on the basis of a main signal produced by demodulating a transmission signal through a main transmission line and an auxiliary signal produced by demodulating a transmission signal through an auxiliary transmission line, said decoder comprising:
  main signal processing means for decoding a main television signal from said main signal;
  auxiliary signal processing means for decoding an auxiliary television signal from said auxiliary signal; and
  synthesizing means for synthesizing said main television signal and said auxiliary television signal so as to reproduce said second television signal.

11. A decoder as claimed in claim 10, wherein said main television signal is the NTSC television system signal.

12. A decoder as claimed in claim 10, wherein said main television signal has a video component including at least one of a horizontal high-band component of a luminance signal, a vertical high-band component of the luminance signal, and a high-band component of a chrominance signal of said second television signal, and said main signal processing means further comprises a decoding circuit and a synthesizing circuit of said video component, and thereby decodes said video component.

13. A decoder as claimed in claim 10, wherein said main television signal has an audio component encoded by applying an audio signal to an audio quasi-instantaneous compressing differential PCM, and said main signal processing means further comprises a quasi-instantaneous expanding differential decoding circuit and a PCM decoding circuit, and thereby decodes said audio component.

14. A decoder as claimed in claim 10, wherein said main television signal has an audio component encoded by sampling, and said main signal processing means further comprises a sampling circuit, and thereby decodes said audio component.

15. A decoder as claimed in claim 10, wherein said auxiliary television signal has a video component including at least a high-band component of the motion information of images, and said auxiliary signal processing means further comprises a decoding circuit of said high-band component of the motion information of images.

16. A decoder as claimed in claim 15, wherein said auxiliary television signal has a video component including said high-band component of the motion information and other information, and said auxiliary signal processing means further comprises a decoding circuit of said other information.

17. A decoder as claimed in claim 10, wherein said auxiliary signal processing means, when the audio component of said auxiliary television signal is an audio component excluded from an audio signal by an audio quasi-instantaneous compressing differential PCM, further comprises a decoding circuit of said audio component excluded from said audio signal.

18. A decoder as claimed in claim 10, wherein said auxiliary television signal has the audio component excluded from an audio signal by sampling, and said auxiliary signal processing means further comprises a decoding circuit of said audio component excluded from said audio signal.

19. A high-definition television system having an encoder for encoding a high definition second television signal into a main signal to be modulated and transmitted by a main transmission line and an auxiliary signal to be modulated and transmitted by an auxiliary transmission line, and having a decoder for decoding said high definition second television signal from said main signal produced by demodulating a signal transmitted by said main transmission line and said auxiliary signal produced by demodulating a signal transmitted by said auxiliary transmission line, said high-definition television system comprising:
  separation means for separating a second television signal having higher definition than a first television signal into a main television signal and an auxiliary television signal, said separation means including a dividing means for dividing said second television signal into a first band corresponding to that of said first television signal and a second band above said first band, said main television signal having a bandwidth corresponding to that of the first television signal, said auxiliary television signal having information, the amount of which corresponds to that of said second band;
  first main signal processing means for producing said main signal from said main television signal, said main signal having a bandwidth equal to that of said main transmission line;
  first auxiliary signal processing means for producing said auxiliary signal from said auxiliary television signal, said auxiliary signal having a bandwidth equal to that of said auxiliary transmission line;

second main signal processing means for decoding said main television signal from said main signal;

second auxiliary signal processing means for decoding said auxiliary television signal from said auxiliary signal; and synthesizing means for synthesizing said second television signal from said main television signal and said auxiliary television signal.

20. A high-definition television system as claimed in claim 19, wherein said auxiliary television signal is a horizontal high-band component of said second television signal, said main transmission line is an NTSC transmission line, and said auxiliary transmission line and said main transmission line are provided as a substantially continuous band transmission line, said television system further comprising:

means for producing said auxiliary signal by shifting upwards the frequency of said auxiliary television signal so that the lowest frequency of the auxiliary signal becomes higher than the frequency of an audio signal of an NTSC television system;

means for synthesizing said auxiliary signal and a video signal of said main signal, and producing a synthesized signal;

means for modulating with extended bandwidth and transmitting said synthesized signal through said continuous band transmission line;

means for demodulating with extended bandwidth said synthesized signal;

means for separating the demodulated signal by said demodulating means into said auxiliary signal and said video signal of said main signal;

means for producing said auxiliary television signal by shifting downwards the frequency of said auxiliary signal in the opposite direction; and means for producing said second television signal of a wide horizontal bandwidth by synthesizing said auxiliary television signal with said video signal of said main signal.

* * * * *

UNITED STATES PATENT AND TRADEMARK OFFICE
CERTIFICATE OF CORRECTION

PATENT NO. : 5,151,779

DATED : September 29, 1992

INVENTOR(S) : Yasuaki Kanatsugu et al.

It is certified that error appears in the above-identified patent and that said Letters Patent is hereby corrected as shown below:

Column 15, line 2, "on" should be --an--.

Signed and Sealed this

Fifth Day of October, 1993

*Attest:*

BRUCE LEHMAN

*Attesting Officer*   *Commissioner of Patents and Trademarks*